United States Patent [19]

Richburg

[11] 4,346,862

[45] Aug. 31, 1982

[54] DUAL LOAD POINT EXTERNAL LOAD SUSPENSION IMPLEMENT

[75] Inventor: Ernest H. Richburg, Hamden, Conn.

[73] Assignee: The United States of America as represented by the Secretary of the Army, Washington, D.C.

[21] Appl. No.: 230,768

[22] Filed: Feb. 2, 1981

[51] Int. Cl.³ .............................................. B64C 1/08
[52] U.S. Cl. ............................ 244/137 R; 294/83 R
[58] Field of Search ............ 244/137 R, 118.1, 138 R, 244/127; 294/78 A, 83 R, 86 LS, 83 R; 89/1.5 R, 1.5 F, 1.5 C, 1.5 G, 1.5 H

[56] References Cited

U.S. PATENT DOCUMENTS

| | | | |
|---|---|---|---|
| 2,703,252 | 3/1955 | Blackwell | 294/78 A |
| 2,777,655 | 1/1957 | Graham | 244/137 R |
| 2,973,923 | 3/1961 | Sznycer | 244/137 R |
| 3,039,746 | 6/1962 | Meyers | 294/83 R |
| 3,554,468 | 1/1971 | McVicar | 244/137 R |
| 4,138,078 | 2/1979 | Hester et al. | 244/137 R |

FOREIGN PATENT DOCUMENTS 200788  10/1967  U.S.S.R. .......................... 244/137 R

*Primary Examiner*—Galen L. Barefoot
*Attorney, Agent, or Firm*—Nathan Edelberg; Robert P. Gibson; Norman L. Wilson, Jr.

[57] ABSTRACT

A dual point suspension implement or apparatus adapted to be secured to a helicopter or the like having a single point external loads attachment hook so as to support an external load by means of two suspension lines spaced longitudinally from one another. The dual point suspension implement comprises a carriage support secured to the aircraft forward of the aircraft hook, the carriage support extending laterally and comprising a curved track member having its radius of curvature substantially coincident with the pivot axis of the aircraft hook. The implement further comprises a carriage having a plurality of rollers which are engageable with the curved track whereby the carriage is free to move or swing along the curved track in arcuate fashion so that the implement together with the load is free to swing relative to the aircraft about the pivot axis of the aircraft hook. The implement further includes a main body extending longitudinally of the aircraft below the support structure. The main body is engageable with the aircraft hook and further has two external load suspension points spaced from one another with the aircraft hook being intermediate the external loads suspension points. The main body of the implement further has a portion at the front thereof for engagement with the carriage, this carriage engagement portion, upon selective actuation of the main aircraft hook for jettisoning, permitting the main body to swing downwardly from a load carrying position to a release position in which the carriage engagement member cleanly separates from the carriage allowing the main body and any external load carried thereby to fall free of the aircraft.

4 Claims, 4 Drawing Figures

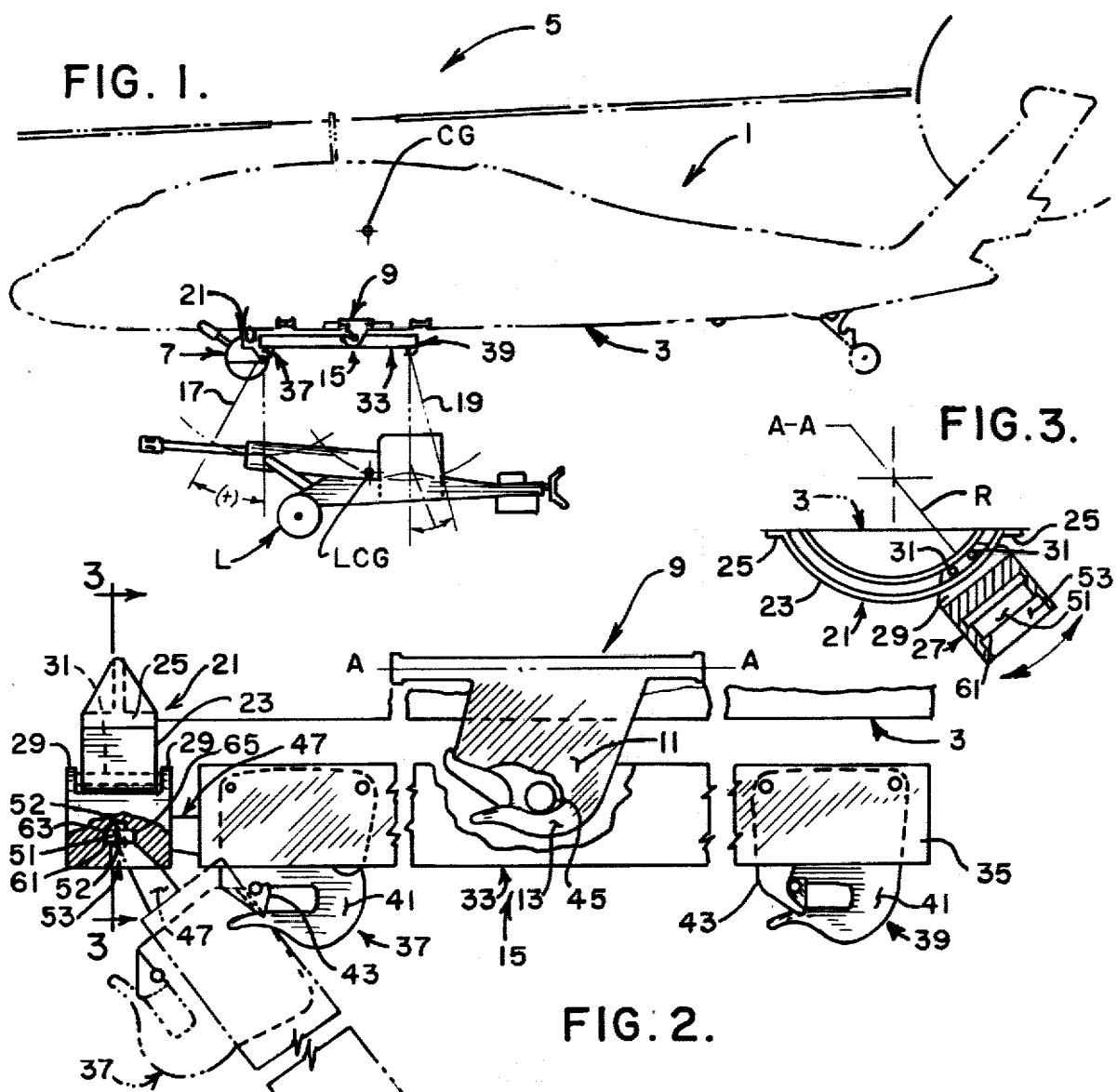
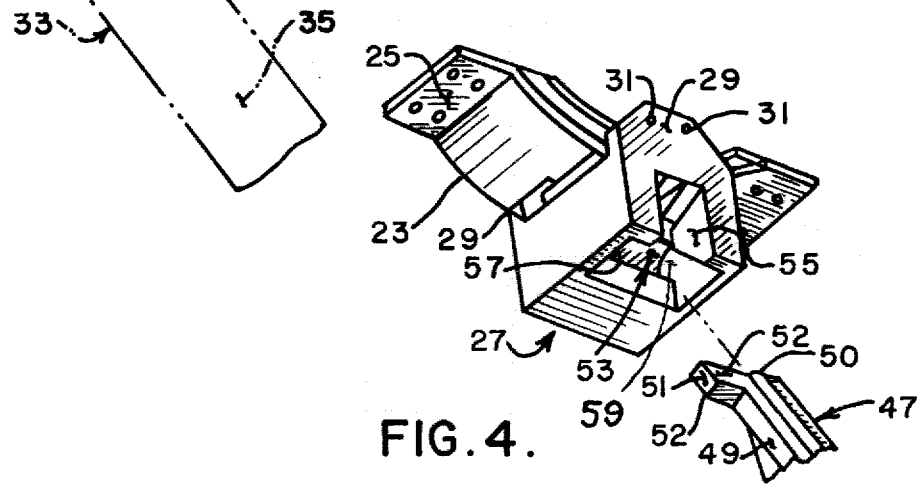

DUAL LOAD POINT EXTERNAL LOAD SUSPENSION IMPLEMENT

BACKGROUND OF THE INVENTION

This invention relates to a dual point external load suspension implement adapted to be fitted to a rotary wing aircraft or the like enabling the aircraft to carry external loads with maximum flight stability.

Flights with loads externally suspended from a single suspension point oftentimes are restricted in their performance because of load instability. Helicopter flight stability may be enhanced by utilizing a two point suspension from the aircraft to the load. Conversion of a single hook aircraft can be accomplished by attaching a dual hook load beam to an existing single hook attachment point on the aircraft and by securing a beam in longitudinal direction to the aircraft by means of the single main cargo hook and by adding a second suspension point to the aircraft structure.

In applications requiring jettisoning of an external load, there exist problems of reliability in insuring that the coordinated release of each of the attachment points to the aircraft is effected. The two suspension points must provide positive support for the beam while providing a reliable release mechanism that is dependent only on the actuation of the main hook release system for the main aircraft cargo hook. The load must also be free to sway about an axis parallel to the longitudinal axis of the aircraft to prevent degradation of the aircraft performance in regard to roll motion.

A previous attempt to provide a passive release capability at one of the two suspension points utilized a ball and socket joint at the end of a "shepherd's crook". The ball and socket joint was the pivot point for sway motion, while the "shepherd's crook" locked the assembly as the beam was rotated to its locked horizontal position. When the primary suspension point was released, the beam rotated downwardly and rolled the "shepherd's crook" along a bearing until it was free to fall clear.

However, the "shepherd's crook" approach required complex and critical machining at both the "crook" bearing surface and the ball and socket joint. When applied to an existing single point suspension, this system had the further disadvantage of either requiring modification to the aircraft for internally mounting the ball and socket or having an external mount with a swing axis which was not coincident with that of the primary suspension hook, thus inducing out-of-plane loads which adversely affected the stability of the aircraft and which caused fatigue design problems.

Reference may be made to such U.S. Pat. Nos. 2,953,330 and 4,138,078 which disclose dual point suspension beams in the same general field as the present invention.

SUMMARY OF THE INVENTION

Among the several objects and features of the present invention may be noted the provision of a dual point external load suspension implement which may be adapted to be used by an aircraft already having a single suspension point load hook without major modification to the aircraft;

The provision for such a dual point suspension implement which is free to sway about an axis parallel to the longitudinal axis of the aircraft with a radius of action substantially identical to the lateral sway axis of the primary suspension hook thereby to prevent degradation of the aircraft flight performance characteristics in regard to roll;

The provision of such a dual point suspension implement which does not require complex and critical machining at its secondary suspension point;

The provision of such a dual point suspension implement which has a passive release mechanism dependent only on the actuation of the main aircraft cargo hook mechanism;

The provision of such a dual point suspension mechanism which has a single and reliable coordinated release mechanism at each of its suspension points; and The provision of such a dual point suspension implement which may be used with off-the-shelf components to provide two points of suspension for external loads.

Other objects and features of this invention will be in part apparent and in part pointed out hereinafter.

Briefly, an aircraft, such as a helicopter or the like, has a support structure and a single point external loads attachment hook which is pivotal about an axis parallel to the longitudinal axis of the aircraft and which is selectively operable between a first position in which a load is securely held and a second position in which the load may be released. Specifically, the improvement of this invention comprises a dual point suspension implement adapted to be secured to the aircraft to support an external load by means of two load suspension points spaced longitudinally from one another on the dual point suspension implement. The dual point suspension implement comprises a carriage support adapted to be secured to the aircraft's support structure forwardly of the aircraft hook and extending laterally with respect to the aircraft. The carriage support comprises a curved track member having its radius of curvature substantially coincident with the pivot axis of the aircraft hook. The dual point suspension implement further comprises a carriage having a plurality of rollers which are engageable with the curved track whereby the carriage is free to move along the curved track in arcuate fashion with respect to the pivotal axis of the aircraft hook and whereby the implement is free to swing relative to the aircraft about its pivotal axis. The dual point suspension implement further comprises a main body extending longitudinally of the aircraft below the support structure. The dual point suspension implement further comprises means carried by the main body for engagement with the aircraft hook means. The main body has two external loads suspension points spaced from one another therealong in longitudinal direction. The means for engaging the aircraft hook is intermediate the two external loads suspension points. The main body further includes means at the front thereof for engagement with the carriage, this carriage engagement means, upon selective operation of the aircraft hook from its first to its second position permitting the main body to swing downwardly from a load carrying position in which the main body is substantially parallel to the longitudinal of the aircraft to a release position in which the main body angles downwardly relative to the aircraft longitudinal axis and pivots about the carriage engagement means and in which the carriage engagement means separates from the carriage allowing the main body and any external load carried thereby to fall free of the aircraft.

BRIEF DESCRIPTION OF THE DRAWINGS

FIG. 1 is a side elevational view of a rotary wing aircraft employing a dual point suspension implement of the present invention to support an external load;

FIG. 2 is an enlarged side elevational view of the dual point suspension implement (in solid lines) as it is attached to the bottom of the aircraft support structure illustrating the primary aircraft suspension hook which is pivotal about a longitudinal axis relative to the aircraft and further illustrating (in phantom lines) the implement in its released position;

FIG. 3 is a cross sectional view taken along line 3—3 of FIG. 2 illustrating the front attachment point of the dual point suspension implement to the aircraft structure, this front suspension point being shown to be a curved track; and FIG. 4 is a bottom perspective view of the curved track and the carriage attachment point for the dual point suspension implement with the forward end of the main body of the dual point suspension implement being adapted for insertion into the carriage.

Corresponding reference characters indicate corresponding parts throughout the several views of the drawings.

DESCRIPTION OF THE PREFERRED EMBODIMENT

Referring now to the drawings, and more particularly to FIGS. 1 and 2, a rotary wing aircraft shown in its entirety by reference character 1 includes a fuselage 3, a rotor assembly 5, and landing gear 7. The aircraft is shown to have an approximate center of gravity, as indicated at CG. Further, the aircraft includes a single point cargo hook assembly, as generally indicated at 9. This cargo hook assembly is constructed in a manner well known to those skilled in the art and may take many forms. As is typical, the cargo hook assembly is selectively, remotely operable by the pilot of the aircraft so as to release or jettison an external load L suspended from the cargo hook. The cargo hook assembly 9 comprises a hook body 11 having a hook portion 13 thereof with the hook body being pivotally mounted to fuselage 3 (also referred to as the aircraft support structure) so as to pivotally mount the hook for rotation about an axis A—A which is generally parallel to the longitudinal axis of the aircraft.

In accordance with the instant invention, aircraft 1 is further provided with a dual point suspension implement of the present invention, as generally indicated at 15, adapted to be removably fitted to the aircraft and to support an external load L suspended beneath the aircraft by means of two suspension lines 17 and 19 spaced longitudinally (i.e., fore and aft from one another). By supporting external load L in the manner described above, it will be appreciated that the external load L is free to sway about an axis parallel to the longitudinal axis of the aircraft, but the fore and aft swaying motin of the external load is substantially reduced. It will be further recognized that the provision of such a dual point suspension implement 15 allows the external load L to be supported by two suspension lines 17 and 19 from an aircraft having only a single cargo hook assembly 9 without major structural modifications to the aircraft. The external load L, when supported in this manner, has an approximate load center of gravity, as indicated at LCG.

Referring now to FIGS. 3 and 4, the carriage support 21 is shown to be fixedly secured to a hard point on fuselage 3. A curved track 23 is attached by its flanges 25 to the fuselage and is shown to have a radius curvature R (FIG. 3) substantially coincident with the main hook 9 pivot axis A—A. A carriage, as indicated at 27, is preferably a one-piece block machined from a suitable high strength steel alloy or the like, and has flanges 29 at each side thereof which prevent fore and aft movement of carriage 27 relative to the curved track. Carriage 27 is also shown to have a plurality of rollers 31 which are journaled between flanges 29 and which are held captive in the curved tracks thereby to permit carriage 27 to roll in arcuate fashion about axis A—A. This arrangement allows the carriage to roll on curved track 23 in side-to-side direction relative to the aircraft, as shown in FIG. 3, and is, in effect, free to pivot or swing on axis A—A.

Further in accordance with this invention, and as shown in FIGS. 1 and 2, the dual point suspension implement 15 further comprises a main body 33 extending longitudinally of the aircraft. Main body 33 comprises an elongate box beam 35 having thereon a front suspension point 37 and a rear suspension point 39. Each of these suspension points comprises a hook body 41 and a closure latch 43. Each hook is adapted to receive the eye end of a respective cargo line 17 or 19 and each closure latch 43 is intended to positively hold the suspension line eye within the hook. Box beam 35 further comprises a lug 45 intermediate suspension points or hooks 37 and 39. Lug 45 extends between the side walls of box beam 35 which are spaced so as to receive hook body 11 of hook 9; the entire arrangement being designed such that hook 9 is engageable with lug 45.

As shown in FIG. 2, main body 33 further has a front support arm 47 rigidly cantilevered forwardly from the front end of beam 35. As best shown in FIG. 4, arm 47 has a main stem 49 and a head 50, the latter being comprised of a lug 51 extending laterally outwardly from each side of the main stem. Head 51 is in part cylindrical with flats 52 on the top and bottom surfaces thereof for purposes as will appear As best shown in FIGS. 3 and 4, carriage 27 has a receptacle 53 formed therein for receiving arm 47 and for positively securing the front end of main body 33 to aircraft 1. Receptacle 53 has an opening 55 in the rear face thereof and another opening 57 in the bottom thereof. Opening 55 is of a width as to be only slightly wider than arm or stem 47. Bottom opening 57, however, is of such a width as to permit head 51 to be inserted into receptacle 53. This receptacle has a partial cylindrical portion 59 within carriage 27 somewhat larger than head 51 and has a horizontal shoulder 61 engageable with the forward underside flats 52 of head 51 when main body 33 is in its load carrying position (as shown in solid lines in FIG. 3) so as to support the forward end of the main body relative to the carriage. Within receptacle 53, cylindrical shoulders 63 and 65 are provided for preventing fore and aft movement of arm 47 relative to carriage 27 when main body 33 is in its load carrying position. As best shown in FIG. 4, opening 55 is in communication with opening 57 for purposes as will hereinafter become apparent.

The dual point suspension implement 15 is designed to allow an aircraft to carry an external load L from two suspension points 37 and 39 via suspension lines 17 and 19 thereby increasing inflight stability of the aircraft and the load. Such a load is normally attached by manual operation of each closure latch 43 at each of the suspension points 37 and 39 and subsequently released by pilot initiated electrical actuation of the hooks 37 and 39. However, in certain operational modes, such as in a jettison mode, it may become necessary for the pilot to instantaneously jettison or otherwise release load L from the aircraft by remote operation of the main aircraft hook assembly 9. In accordance with this invention, load L together with the dual point suspension implement 15 may be jettisoned by the pilot's remote operation of cargo hook assembly 9 in the conventional manner.

Upon releasing cargo hook assembly 9, hook 13 retracts or releases clear of lug 45 thereby releasing the rear portion of main body 33 and permitting the main body to swing downwardly from its load carrying position (as indicated in solid lines in FIG. 2) to a release or drop away position (as indicated in phantom lines in FIG. 2). As main body 33 swings downwardly to its release position, stem 49 swings downwardly and head 51 rotates in receptacle 53. When main body 33 swings to its release position, head 51 moves clear of the surfaces on shoulder 61, 63 and 65 within carriage 27 and is then free to fall rearwardly and downwardly via opening 53 clear of the carriage thereby releasing both main body 33 and the external load L.

As should be apparent, the dual point suspension implement 15 of the present invention enables an aircraft 1 already having a standard single cargo hook assembly 9 to carry an external load L from two suspension points 37 and 39 thereby increasing flight stability without requiring substantial structural modification to the aircraft and without impeding the remote load release capability of the main aircraft load suspension hook assembly 9. The present invention allows such improvements in load carrying operation without requiring complex machining made necessary by the prior art implements and also insures reliability of the remote load release over the prior art mechanism.

It will also be apparent from observing the relative location of suspension points 37 and 39 relative to lug 45 that the majority of the weight of the external load L is carried by the main suspension hook assembly 9 of the aircraft so that the combined center of gravity of the external load LCG and the center of gravity CG of the aircraft remains at the approximate center of gravity of the aircraft. Thus, in essence, the load carried by the front suspension point the carriage support 21 is a relatively small part of the total weight of the external load L.

In view of the above, it will be seen that other objects of this invention are achieved and other advantageous results obtained.

As various changes could be made in the above constructions without departing from the scope of the invention, it is intended that all matter contained in the above description and shown in the accompanying drawings shall be interpreted as illustrative and not in a limiting sense.

What is claimed is:

1. In an aircraft, such as a helicopter or the like, having a support structure and a single point external loads attachment hook means, said aircraft hook means being pivotal about an axis parallel to the longitudinal axis of said aircraft and being selectively operable between a first position in which a load is securely held thereby and a second position in which said load may be selectively released, wherein the improvement comprises: a dual point suspension implement adapted to be secured to said aircraft and to support an external load by means of two load suspension points spaced longitudinally from one another on said dual point suspension implement, said suspension implement comprising a carriage support secured to said aircraft support structure forwardly of said aircraft hook means, said carriage support extending laterally with respect to said aircraft and comprising a curved track member having its radius of curvature substantially coincident with said pivot axis of said aircraft hook means, said implement further comprising a carriage, the latter having a plurality of rollers, said rollers being engageable with said curved track whereby said carriage is free to move along said curved track in arcuate fashion with respect to said pivotal axis of said aircraft hook means whereby said implement is free to swing relative to said aircraft relative to said pivot axis, and a main body extending longitudinally of the aircraft below said support structure, means carried by said main body for engagement with said aircraft hook means, said main body further having said two external loads suspension points spaced from one another therealong in longitudinal direction of said aircraft, said means for engaging said aircraft hook means being intermediate said two external loads suspension points, said main body further having means at the front of said main body for engagement with said carriage, said carriage engagement means upon selective actuation of said aircraft hook means from its first to its second position permitting said main body to swing downwardly from a load carrying position in which said main body is substantially parallel to the longitudinal axis of said aircraft to a release position in which said main body angles downwardly relative to said aircraft longitudinal axis and pivots about said carriage engagement means and in which said carriage engagement means separates from said carriage allowing said main body and any external load carried thereby to fall free of said aircraft.

2. In a dual point suspension implement as set forth in claim 1 wherein said carriage has a receptacle therein open from the bottom and rear thereof, said carriage engagement means being insertable into said receptacle from the bottom and being rotatable upwardly relative to the carriage from said release position to said load carrying position in which said carriage engagement means cooperates with said carriage to support the forward end of said main body.

3. A dual point suspension implement as set forth in claim 2 wherein said carriage engagement means comprises an arm extending out beyond the forward end of said main body, said arm having an enlarged head, said receptacle and said carriage being so structured as to receive said head when the latter is inserted from below and is further so structured as to support said head against lateral, vertical, and fore and aft movement when the main body is in its load carrying position.

4. A dual point suspension implement as set forth in claim 1 wherein said main body is structured to receive said aircraft hook means intermediate said external load suspension points, and wherein said means for engaging said aircraft hook means comprises a lug secured within said main body.

* * * * *